US008682471B2

(12) United States Patent
Starr et al.

(10) Patent No.: US 8,682,471 B2
(45) Date of Patent: Mar. 25, 2014

(54) EFFICIENT MAGAZINE MOVES (75) Inventors: Matthew Thomas Starr, Lafayette, CO (US); Nathan Christopher Thompson, Boulder, CO (US); Mark Lorin Lantry, Erie, CO (US); Daniel Spencer Zmolek, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 525 days.

(21) Appl. No.: 12/891,311

(22) Filed: Sep. 27, 2010

(65) Prior Publication Data

US 2012/0076622 A1    Mar. 29, 2012

(51) Int. Cl.
G06F 7/00 (2006.01)
G06F 13/00 (2006.01)
G06F 9/34 (2006.01)
B65G 65/04 (2006.01)

(52) U.S. Cl.
USPC .......... 700/214; 700/215; 700/226; 711/111; 711/202; 711/200; 711/154; 414/273

(58) Field of Classification Search
None
See application file for complete search history.

(56) References Cited

U.S. PATENT DOCUMENTS

| 5,818,723 | A | 10/1998 | Dimitri |
| 6,304,524 | B1 | 10/2001 | Gallo et al. |
| 6,401,011 | B1 | 6/2002 | Hashimukai |
| 6,570,734 | B2 | 5/2003 | Ostwald et al. |
| 6,671,580 | B2 | 12/2003 | Campbell et al. |
| 6,691,001 | B2 | 2/2004 | Ostwald et al. |
| 6,725,394 | B1 * | 4/2004 | Bolt ............................. 714/5.11 |
| 6,804,580 | B1 | 10/2004 | Stoddard |
| 7,076,327 | B1 | 7/2006 | Desai et al. |
| 7,131,025 | B2 | 10/2006 | Tarcea et al. |
| 7,211,980 | B1 | 5/2007 | Bruemmer et al. |
| 7,251,606 | B2 | 7/2007 | Horinaka et al. |
| 7,263,596 | B1 * | 8/2007 | Wideman et al. ............. 711/209 |
| 7,308,529 | B1 | 12/2007 | Desai |
| 7,370,173 | B2 | 5/2008 | Justiss et al. |
| 2003/0037061 | A1 | 2/2003 | Sastri et al. |
| 2004/0181388 | A1 | 9/2004 | Yip et al. |
| 2006/0132964 | A1 | 6/2006 | Lau et al. |
| 2008/0114936 | A1 | 5/2008 | Desai |

* cited by examiner

*Primary Examiner* — Gene Crawford
*Assistant Examiner* — Yolanda Jones
(74) *Attorney, Agent, or Firm* — Kenneth Altshuler (57) ABSTRACT A storage library is described that includes a tape magazine that possesses at least one spare slot and a number of other addressable slots that each contains a tape cartridge. Each addressable slot is mapped and made known to a host when the host is linked to the storage library. One of the addressable slots contains a tape cartridge that prior to being mapped as an addressable slot was formerly a spare slot unmapped to the host and the current spare slot was formerly mapped as an addressable slot.

27 Claims, 11 Drawing Sheets

EFFICIENT MAGAZINE MOVES

CROSS-REFERENCE TO RELATED APPLICATIONS

None.

BACKGROUND OF THE INVENTION

1. Field of the Invention

The present embodiments are directed to a data cartridge library that is useful in storing data on a recording medium located in a cartridge and/or retrieving data from such a recording medium.

2. Description of Related Art

Presently, magazine-based data cartridge libraries transfer tape cartridges between a substantially inflexibly assigned slot addressed to a magazine and a tape drive. Today, if access to a target tape cartridge is required, for reading and/or writing data, the accompanying magazine is moved from a shelf system to a position near a tape drive for the target tape to be moved from the magazine to the drive where it is loaded therein. The magazine is then moved back to the shelf system. After all storage operations are completed, the magazine is moved back from the shelf to the position near the tape drive and the tape cartridge is disposed back into the slot from whence it came and the magazine is moved back, again, to the shelf system. These basic operations are essentially repeated each and every time a new tape cartridge is accessed.

It is to innovations related to this subject matter that the claimed invention is generally directed.

SUMMARY OF THE INVENTION

The present embodiments generally relate to a magazine-based library that re-orders slot address assignments in magazines to optimize move operations in the magazine-based library.

Some embodiments of the present invention contemplate a data storage library comprising: a magazine adapted to possess a plurality of slots that are mapped to a client, including a first slot mapped via a first slot address, the data storage library adapted to form a link with the client, a spare slot devoid of being mapped to the client, and a first mobile storage cartridge disposed in the first slot wherein prior to being mapped as the first slot, the first slot was the spare slot.

Other embodiments of the present invention can therefore comprise a method used in a data storage library, the method comprising: providing a first magazine and a second magazine, wherein the first magazine possesses a first slot that corresponds by identity to a first mobile media, wherein the second magazine possesses a second slot that corresponds by identity to a second mobile media, the second magazine possessing a second spare slot wherein the second spare slot is devoid of being identified by the client; receiving an unmount instruction from a client to dispose the first mobile media from a tape drive to the first slot;

responding to the client that the unmount instruction is accomplished before actually carrying out the unmount instruction; receiving a load instruction from the client to load the second tape cartridge in the tape drive; in response to the load instruction, moving the second magazine in a position ready to transfer the second tape cartridge from the second magazine to the tape drive; unloading the first tape cartridge from the tape drive and disposing the first tape cartridge in the second spare slot; remapping the second spare slot to be identified as the first slot; and loading the second tape cartridge in the tape drive to form a cooperating read and write relationship.

Yet other embodiments of the present invention can therefore comprise a method comprising: providing a first mobile storage cartridge that assumes a first identity associated with a first slot address, and a second mobile storage cartridge that assumes a second identity associated with a second slot address, the first and second identities known to a client; providing a magazine possessing a spare slot that is devoid of a mobile storage cartridge, the spare slot not identified by the client, the magazine possessing the second mobile storage cartridge disposed in a second slot corresponding to the second slot address; moving the first mobile storage cartridge from a cartridge drive to the spare slot; mapping the spare slot to assume the first identity of the first slot address; and moving the second mobile storage cartridge from the second slot to the cartridge drive.

And, yet other embodiments of the present invention can therefore comprise a data storage library that transfers data between a client and a data storage device in response to access commands from the client, the data storage library comprising: a magazine defining a plurality of slots that are individually addressable; a transporter that selectively moves the magazine to a remove/insert position; a plurality of data storage devices, each removably insertable by the transporter into a respective one of the plurality of slots; and mapping logic executing computer instructions stored in memory that are responsive to one of the access commands to identify an available slot in the magazine for a previously removed data storage device, the available slot being different than another slot from which the previously removed data storage device was previously removed.

DETAILED DESCRIPTION

Figure 1:
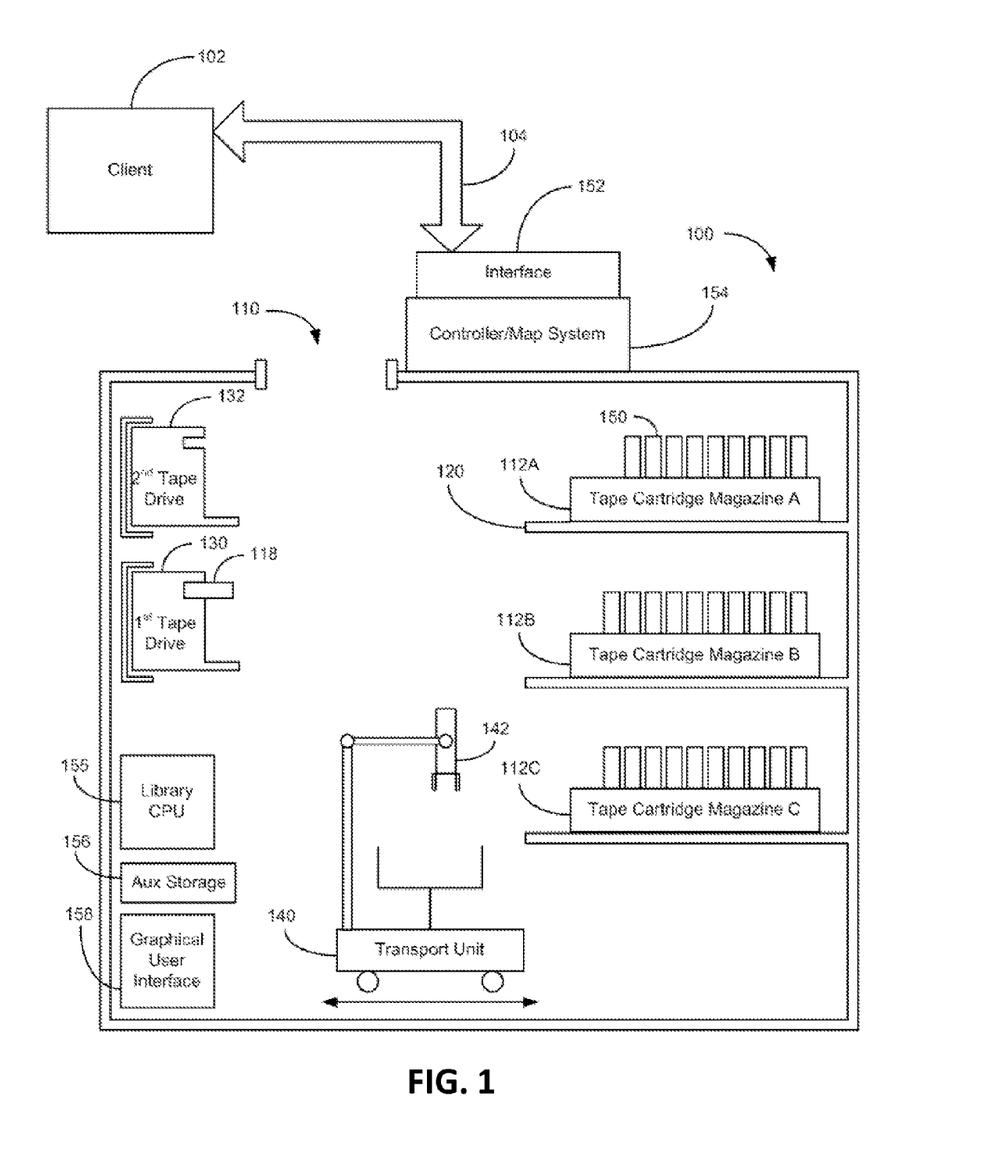
FIG. 1 is an illustration of a data storage arrangement constructed in accordance with embodiments of the present invention.

Referring to the drawings in general, and more specifically to FIG. 1, shown therein is an illustration of a data storage arrangement constructed in accordance with embodiments of the present invention. In what follows, similar or identical structures may be identified using identical callouts.

The data storage arrangement illustrated in FIG. 1 can comprise a user of data 102, such as a client or host, in communication with a data storage library 100. As illustratively shown, the client 102 is in communication with the library 100 via a communication path 104 and the library interface device 152. The library 100 comprises a plurality of tape cartridges 150 disposed in a tape cartridge magazine, such as tape cartridge magazine 'A' 112A. Herein, tape cartridge magazine 112 will be used to denote a generic tape cartridge magazine. Each tape cartridge magazine 112 contains a plurality of slots (not shown) wherein each slot is adapted to accommodate a tape cartridge 150. Here, the library 100 may be configured to maintain a map of the slots in each magazine 112. More specifically, each slot in a magazine 112 will have a unique identification, such as an address. A tape cartridge 150 disposed in a particular slot may assume the identity of the particular slot. Optionally, a tape cartridge 150 can be simply identified by a serial number, or other indicia (such as a bar code, medium auxiliary memory information, etc.), and be assigned, or mapped, to different slots, by a host computer 102, for example. Hence, a tape cartridge disposed in a third slot whose address is mapped as slot number three will assume the identity of slot number three. In other words, the tape cartridge will be mapped and identified as "slot number three" in this example.

The library 100 can further comprise a shelving system 120 capable of archiving the tape cartridge magazines 112 or independent tape cartridges 150, within the library 100. The library 100 further accommodates at least one transporter 140, though in optional library embodiments, multiple transporters can exist. The transporter 140 comprises a carriage or other means for transporting a tape cartridge magazine 112 from the shelf system 120 to a position ready to transfer the tape cartridge 150 from the tape cartridge magazine 112 to a tape drive 132 or 118. An example of a transporting system is a robotic device that moves along a rail system via a belt device, a motorized rack and pinion arrangement, a lead screw arrangement, a motor with wheels, etc. The position ready to transfer the tape cartridge 150 from the tape cartridge magazine 112 to a tape drive is a location that facilitates a tape cartridge 150 to be inserted in one of the drives 130 or 132, such as tape cartridge 118 shown in a cooperating relationship with the first tape drive 130. The tape cartridge 150 can be loaded into or removed from a tape drive via a picker mechanism 142, for example. The cooperating relationship between a tape cartridge and a tape drive is one that facilitates data storage operations, such as reading and writing data to and from the cooperating tape cartridge. In an optional embodiment, the tape cartridges 150 or the tape cartridge magazines 112 may be associated with different users of data which can occur when the storage resources in the library 100 are divided into two or more partitions wherein each partition is associated with the different user of data, for example.

The library 100 also optionally comprises an entry/exit port 110 whereby tape cartridges 150 or tape cartridge magazines 112 can be transferred between an environment external to the library 100 and an environment internal to the library 100. In this embodiment, the library 100 provides a graphical user interface 158 and an auxiliary memory 156, such as one or more disk drives, solid state memory or other non-volatile memory device/s capable of retaining (storing) relevant information related to each tape 150, such as mapping address information of each tape cartridge 150 and each magazine 112. The library 100 further possesses a computer or Central Processing Unit (CPU) 155 that actively cooperates with algorithms to orchestrate the actions and components within the library 100 over a Computer Area Network (CAN). The library 100 possesses a controller/map system 154, which can optionally be functionally included with the CPU 155. The controller/map system 154 maintains the addresses of the components mapped out for the client 102 (i.e., tape slot addresses, drive addresses, robot addresses, etc.) to direct operations within the library 100. FIG. 1 is illustrative of basic components used to exemplify inventive embodiments disclosed herein. As one skilled in the art will appreciate, a data storage library will generally include devices and structures not shown in the block illustration of FIG. 1, such as additional controllers, wiring, cooling systems, switch systems, lighting, protocol bridges, etc.

The client 102, or host computer, identifies (or "sees") the components within the library 100 by transmitting a Small Computer Systems Interface (SCSI) inquiry to scan the storage system's bus (not shown) to discover what devices comprise the storage system 100. Optionally, the map system 154 can provide the information directly to the client 102. An inquiry can be a client 102 or a user effectively asking the storage system 100 "who are you?" and "what are you?" The storage system 100 can show that there are a plurality of tape cartridges 100 located at specified slot addresses (the cartridges being disposed in three magazines 112A, 112B and 112C). The storage system 100 can show that there are two tape drives 130 and 132 at designated addresses and a transporter 140 and/or picker device 142 at designated addresses, for example.

Figure 2A:
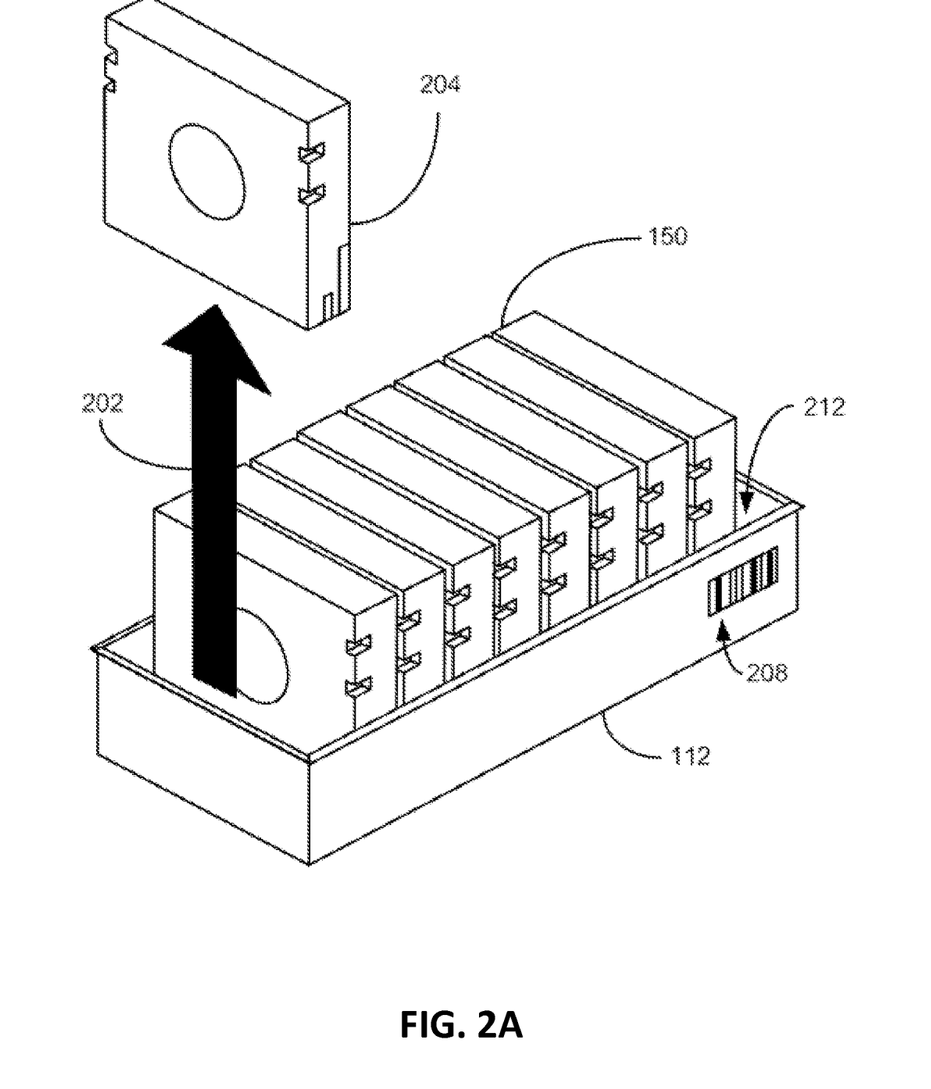
FIG. 2A shows a perspective drawing of a tape cartridge magazine constructed in accordance with embodiments of the present invention.

With reference to FIG. 2A, shown therein are tape cartridges 150 supported by a tape cartridge magazine 112. In more detail, a tape cartridge 150, such as an LTO-3 category tape cartridge, comprises magnetic tape that is capable of storing digital data written by a compatible drive 130 or 132, such as an LTO-3 tape drive manufactured by IBM, when in cooperation to read and write data (i.e. loaded) with the tape cartridge 150 as shown in FIG. 1. The tape cartridge magazine 112 is shown populated with a plurality of tape cartridges 150. A tape cartridge 150 can be removed from the tape cartridge magazine 112, as shown by the arrow 202, and inserted in to the tape drive 130 or 132 by means of a picker device 142, shown in FIG. 1. Disposed on the tape cartridge magazine 112 is a bar code identifier 208 for identifying the tape cartridge magazine 112, which has utility should the tape cartridge magazine 112 be archived in a media pack storage vault that is remote from a library, for example. Some embodiments, all tape cartridges 150 contain a Medium Auxiliary Memory (MAM) device (not shown), however, in alternative embodiments, some tape cartridges may not contain a MAM device. One example of a MAM device is a flash memory device that is activated by radio frequency. In other embodiments of the present invention, the magazine 112 can comprise a magazine auxiliary memory device (not shown) that is capable of containing information (such as tape slot address mapping information, i.e., a tape cartridge corresponding to "slot-1" can retain the identity of "slot-1" on the tape cartridge's MAM) from at least one of the data cartridges 150 the magazine 112 supports. The magazine auxiliary memory device 112 can receive information that is maintained on the tape cartridge MAM devices contained via one or more MAM device readers/writers associated with a tape drive 130 or 132, or some reader not associated with a tape drive, for example. Information from the MAM devices can be read and immediately transmitted to the magazine auxiliary memory device, or alternatively, the information of each MAM device can be stored on the auxiliary storage device 156 and then transferred to the magazine auxiliary memory device, just to name two examples.

A MAM device, in one embodiment, is parceled into three regions in which data can be stored; a medium device region which contains information such as a serial number (or some information corresponding to a tape's bar code, for example), a device region which contains information from the tape drive such as load count, and host/vendor unique region wherein information such as history and/or performance data related to the cartridge 150 can be stored. The information in the regions can be added to with new information via an address related to the arrangement of available storage space in the cartridge MAM device or, optionally, the information can be read by an auxiliary memory reader, such as a MAM reader, and reassembled with additional information and stored on the MAM device as the reassembled version, just to name two examples. In another example, if the storage limit is reached in the MAM device, such as the host/vendor data in the host/vendor unique region, the host/vendor data can be read and stored in an auxiliary storage space, such as the auxiliary memory 156, and the host/vendor unique region purged and made available for new information. In another example, the host/vendor data can be compressed with algorithms to decompress residing in the library 100 or user of data, for example.

Figure 2B:
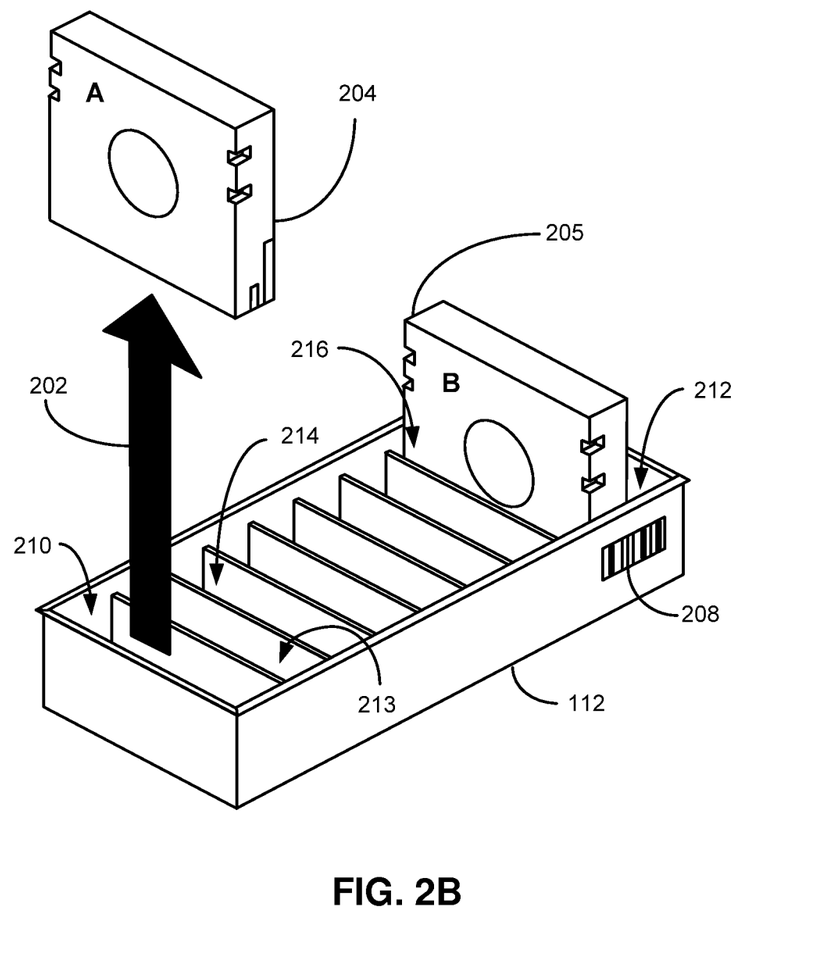
FIG. 2B shows a perspective drawing of a tape cartridge magazine illustrating slots constructed in accordance with embodiments of the present invention.

FIG. 2B is an illustration of a mostly empty magazine 112 consistent with embodiments of the present invention. Here, in one exemplary embodiment, the magazine 112 possesses a plurality of slots, such as a first slot 210, a second slot 213, a third slot 214, etc. The depicted magazine 112 can be mapped to a client 102 as possessing slots one through nine. The tape cartridge "A" 204 originated from the first slot 210 and, therefore, is also mapped to correspond to the first slot 210 address, or more specifically, the tape cartridge 204 with an address associated with the first slot 210. Tape cartridge "B" 205 is the only other tape cartridge shown in FIG. 2B and is disposed in the eighth slot 216. The tape cartridge "B" 205 resides in the eighth slot 216 and, therefore, is also mapped as corresponding to the eighth slot 216 address, or more specifically, the tape cartridge 205 possessing an address associated with the eighth slot 216. In an optional embodiment, the ninth slot 212 is known, or mapped, internally to the library 100 as a spare slot. The spare slot is not necessarily known by the client 102, in other words, the client 102 sees the slot addresses one 210 through eight 216 with no knowledge of the spare slot 212. In an alternate embodiment, the host 102 is provided knowledge of the spare slot 212.

Figure 3A:
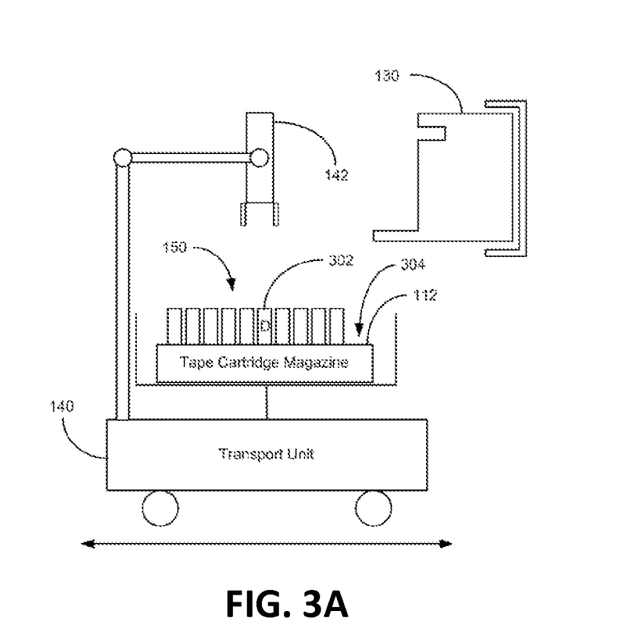
FIGS. 3A and 3B are illustrations of a transporter and picker device constructed in ccordance with an embodiment of the present invention.
Figure 3B:
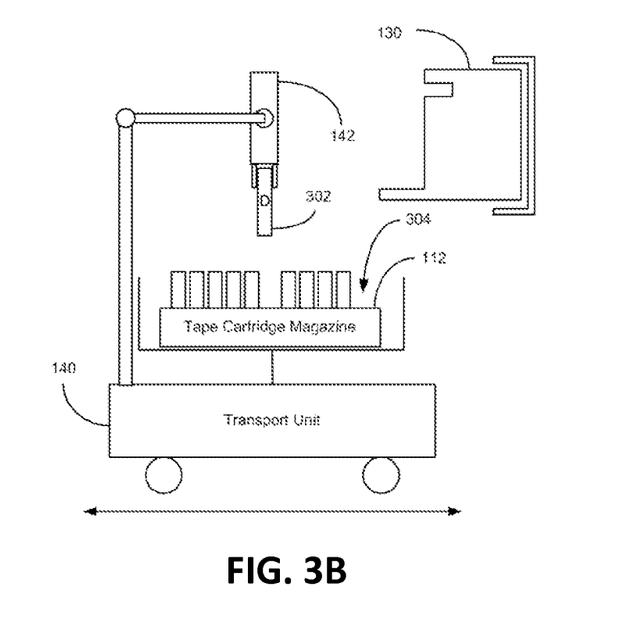

FIGS. 3A and 3B are illustrations of a magazine transport robotic system 140 and picker device 142. As shown in FIGS. 3A and 3B in combination with FIG. 1, the robotic system 140 moves the tape cartridge magazine 112 from a shelf system 120 to a position ready to transfer tape cartridge "D" 302 to a nearby tape drive. Such a position, for example, can be in front of or in close proximity to the tape drive 130. As exemplified in the present figures, the "ready to transfer position" is a position whereby a picker device 142 can grasp the target tape cartridge "D" 302 from the magazine 112 and insert the target tape cartridge 302 into the target tape drive 130. The depicted tape cartridge magazine 112 possesses ten tape cartridges 150 and one spare slot 304. FIG. 3A illustratively shows the picker device 142 ready to grasp the target tape cartridge "D" 302 from the magazine 112. FIG. 3B illustratively shows the picker device 142 having grasped the target tape cartridge "D" 302 from the magazine 112.

Figure 3C:
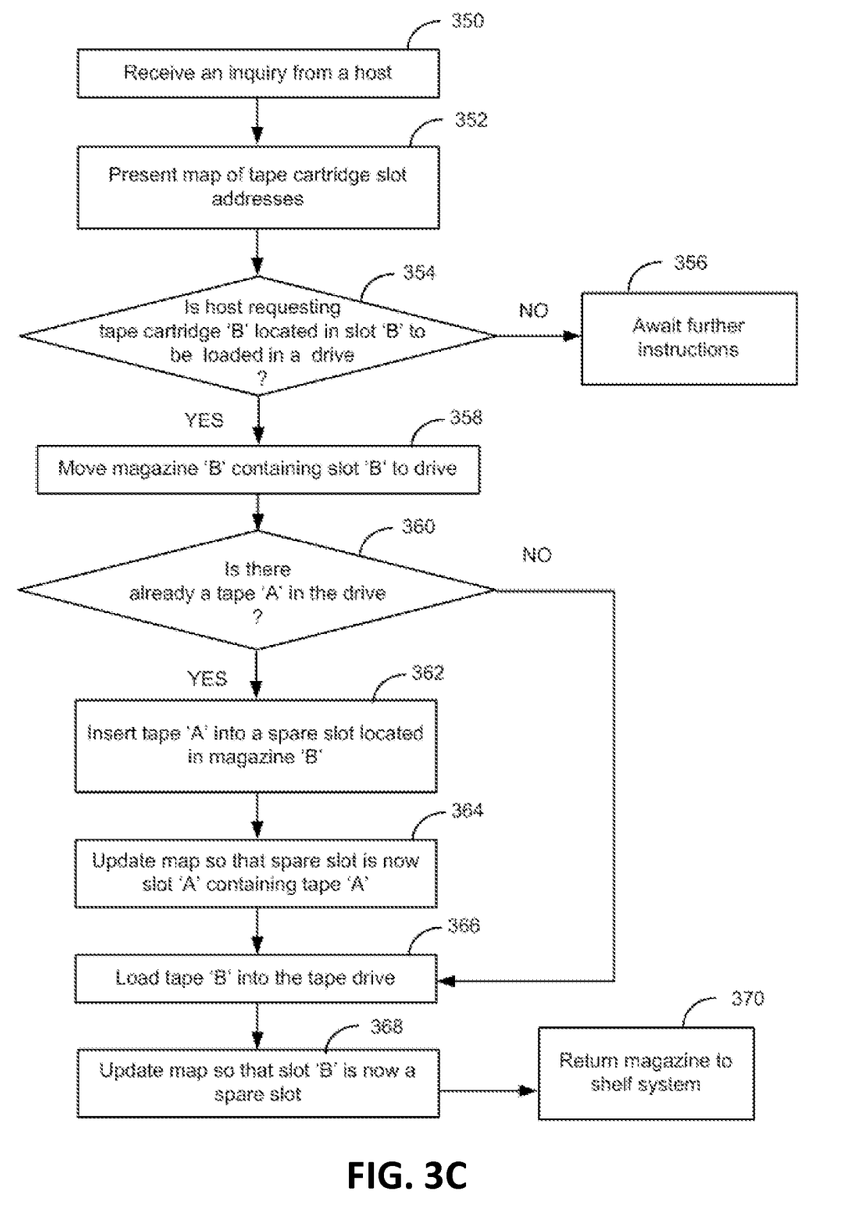
FIG. 3C is a general mapping algorithm embodiment in accordance with certain embodiments of the present invention.

FIG. 3C is a general mapping algorithm embodiment in accordance with certain embodiments of the present invention. The embodiments do not necessarily require the particular sequence of steps that are presented here. The mapping algorithm is made up of instructions that can be stored in memory (e.g., auxiliary storage 156), such as a magnetic disk drive associated with the library 100, and executed on a computer processor such as the library CPU 155, for example. The library map system 154 is a dynamic map system that updates and changes with various tape cartridge 150 moves within the library 100. FIG. 3C is an embodiment of a high level depiction of this logic. Herein, as shown in step 350, the library 100 receives an inquiry from the host 102 to present at least a map of tape cartridge addresses associated with the library 100. As shown in step 352, the library 100 presents a map of tape cartridge addresses associated with the library 100 to the host 102. As shown in step 354, if the host 102 is requesting loading a tape cartridge, which is identified as tape cartridge 'B' located at slot address 'B' in magazine 'B' (the identification 'B' denotation herein for convenience) in a drive 130 then proceed to step 358; if not, then proceed to step 356 to await any further instructions. Step 358 is a step to move magazine 'B', which contains tape cartridge 'B' located at slot address 'B' to a position in the library 100 that makes tape cartridge 'B' accessible to the robotic system 140/142 to transfer tape cartridge 'B' from slot 'B' to the tape drive 130. If there is a tape, for example tape 'A', already in the drive 130, then proceed to step 362; if not, then proceed to step 366. Step 362 is a step of inserting tape 'A' into a spare slot, such as spare slot 304, located in magazine 'B'. The map is then updated to indicate that tape 'A' is in slot 'A' and not in a "spare slot", step 364, (i.e., the spare slot takes on the identity of the slot 'A' to which tape cartridge 'A' belongs). Then tape cartridge 'B' is removed from magazine 'B', slot 'B', and is loaded into the tape drive 130, step 366. As shown in step 368, the map is updated so that slot 'B' is mapped as a spare slot that can later accommodate tape 'B', or some other tape in the future. The address slot 'B' associated with tape cartridge 'B' will follow tape cartridge 'B' when it is inserted in this or another magazine in the future. The magazine 'B' is then returned to a shelf system 120 associated with the library 100, as reflected in step 370.

Figure 4A:
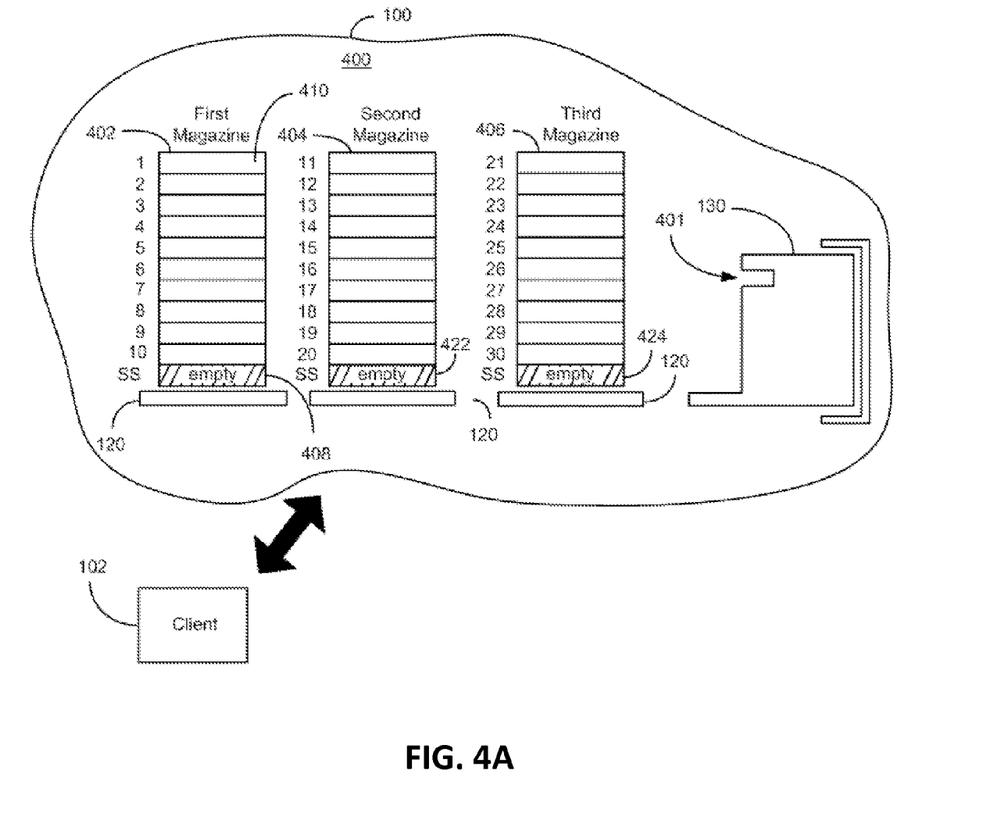
FIGS. 4A-4E are illustrations of embodiments rearranging slot addresses in magazines in accordance with embodiments of the present invention.

FIGS. 4A-4E are illustrations of remapping magazine slots in accordance with certain embodiments of the present invention. With reference to FIG. 4A, shown therein is a storage arrangement 400, consistent with elements in the library 100 of FIG. 1, generally showing the first tape drive 130 and three tape magazines 402, 404 and 406 disposed on the shelf system 120. The storage arrangement 400 is simplified to show the basic elements used herein to illustrate certain embodiments of the present invention. However, though not shown in FIGS. 4A-4E, the storage arrangement 400 can be included in the library system 100. The host 102 is shown directing the elements in the storage arrangement 400, via the two way arrow, which is a simplified model for purposes of descriptions herein. For example, a typical communication path between a library and the host would include additional elements known to those skilled in the art. For simplicity, communication will be generally described herein as between a host 102 and a library system 100 as opposed to over library interfaces, CANs, etc.

The arrangement 400 can comprise a tape drive 130 having an opening 401 that is adapted to receive a tape cartridge 150 to form a cooperating read/write relationship; that is, a relationship that can perform storage operations between the tape cartridge 150 and the tape drive 130. The storage arrangement 400 further shows a first magazine 402 disposed on a shelf system 120. The first depicted magazine 402 possessing eleven slots shown as slot addresses 1-10 and a spare slot 408, designated "SS". In one embodiment, a map of the first magazine 402 is retained in non-volatile memory (not shown) that is maintained by a computer processing system (not shown)

and mapping algorithm, which could optionally be comprised by library central processing unit, such as the library CPU 155 of FIG. 1, for example. Keeping track of slot addresses can be accomplished via an inventory algorithm with pointers that are updated every time a tape cartridge 150 is moved to a new magazine slot. In one embodiment, the first magazine 402 is revealed to the host 102 as having slot addresses 1-10, however the spare slot 408 is not revealed to the host 102. The host 102 also sees slot addresses 11-20 associated with the second magazine 404 and slot addresses 21-20 associated with the third magazine 406. The host 102 does not necessarily see the spare slot 422 associated with the second magazine 404 or the spare slot 424 associated with the third magazine 406. In other words, the host 102 may be devoid of being able to identify the spare slots 408, 422 and 424. The shelf system 120 is shown as a platform accommodating each magazine 402, 404 and 406; however the shelf system 120 is not constrained to reside in one location along one wall of a library, for example.

Figure 4B:
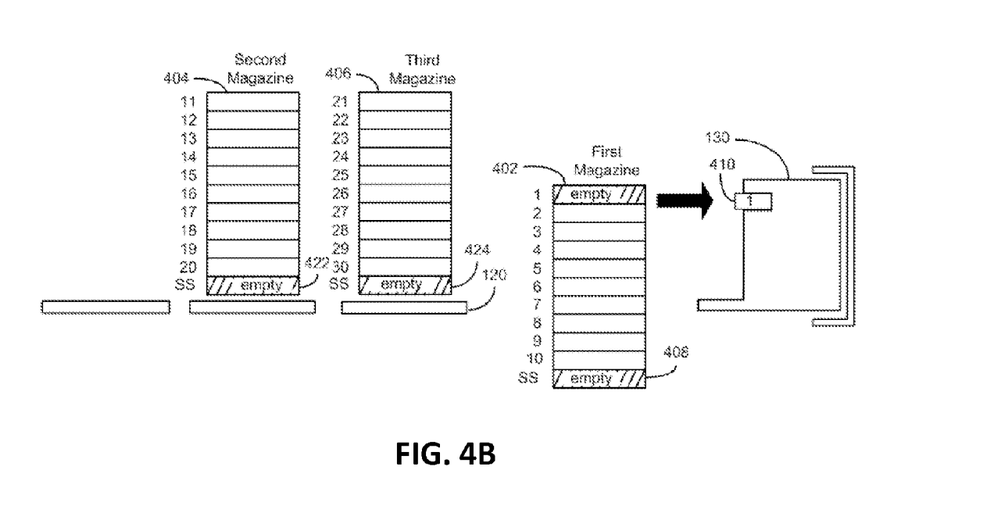
Figure 4C:
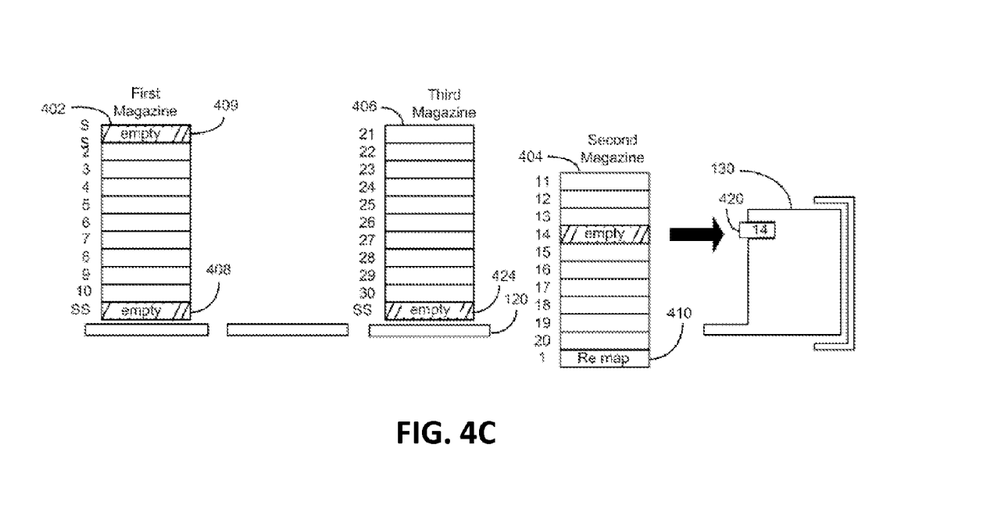
Figure 4D:
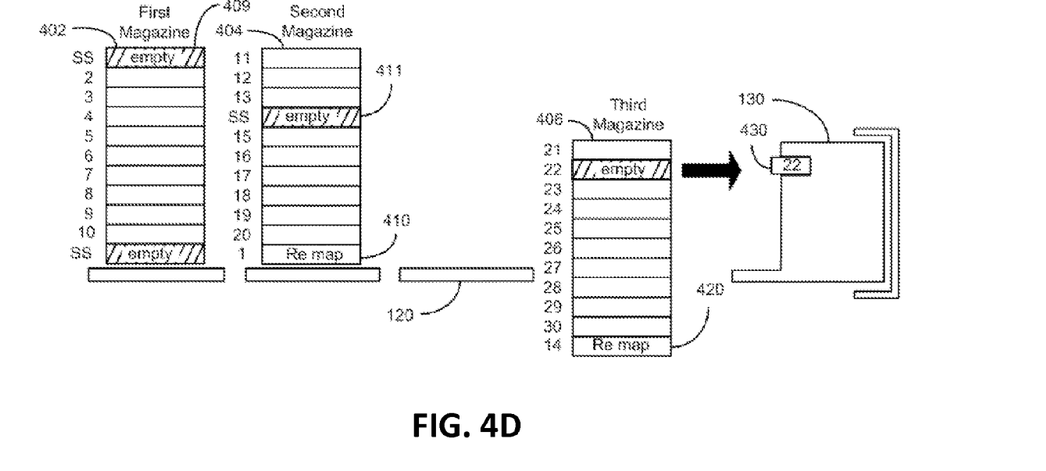
Figure 4E:
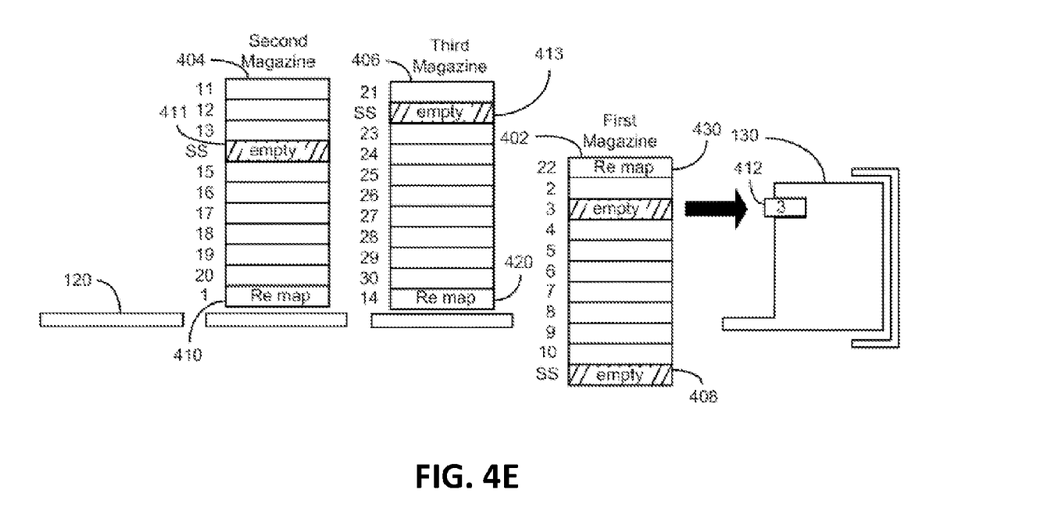
Figure 5:
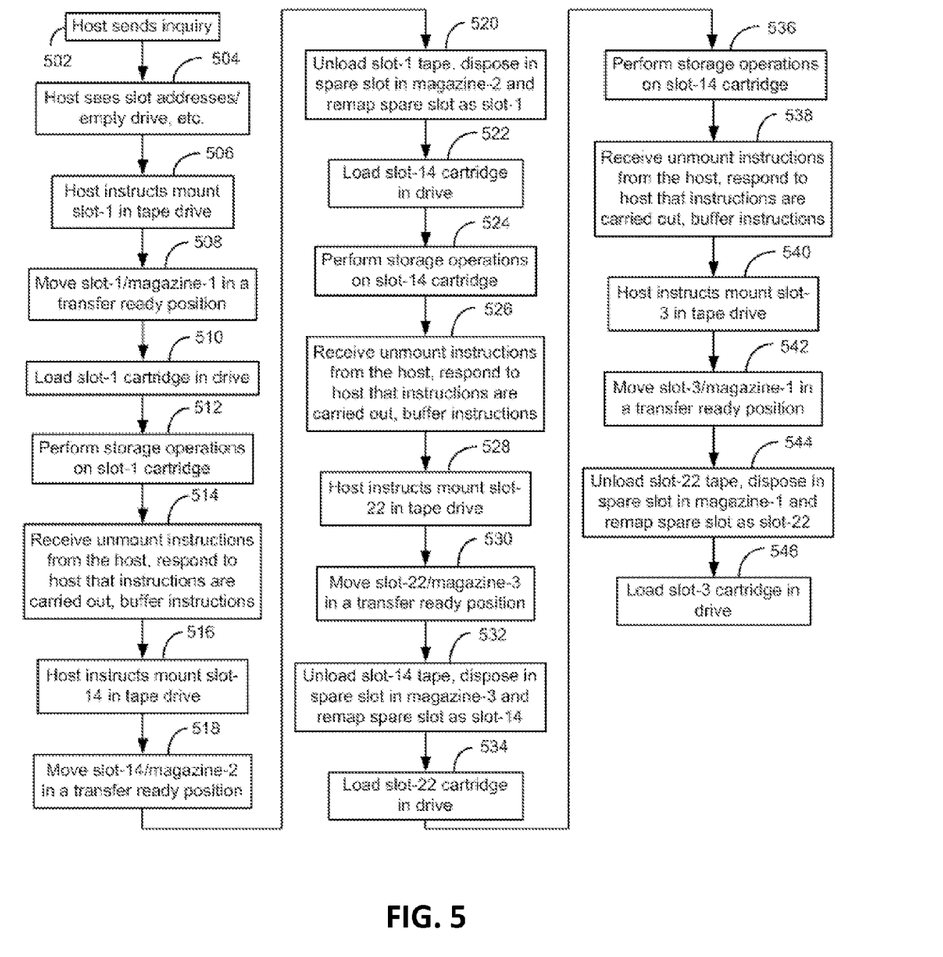
FIG. 5 is a block diagram of a method consistent with embodiments of the present invention.

FIGS. 4A-4E in conjunction with FIG. 5 provides a method exemplifying remapping slot addresses in accordance to an embodiment of the present invention. It should be recognized that the steps presented in the described embodiments of the present invention do not necessarily require any particular sequence unless otherwise stated. With reference to FIG. 4A, the host 102 transmits an inquiry to identify what devices comprise the library 100, shown in step 502.

In step 504, the library 100 indicates to the host 102 that the tape drive 130 is empty and the library 100 includes tape cartridges disposed in slots at addresses 1-30. Again, slot addresses 1-30 are shown in FIG. 4A along the left side of each magazine 402, 404 and 406. For example, the first magazine 402 shows ascending slots 1-10 and a Spare Slot (SS) 408 that is empty, the second magazine 404 shows ascending slots 11-20 and a Spare Slot 422 that is empty, and the third magazine 406 shows ascending slots 21-30 and a Spare Slot 424 that is empty.

In step 506, the host 102 sends an instruction to the library 100 to mount tape cartridge from address slot-1 410 to the tape drive 130. A mounting operation is a move from a location, such as a slot, other drive, or other storage facility, to a target device, such as an active drive, that is available for receiving a tape cartridge.

In step 508, the first magazine 402, that contains the tape cartridge corresponding to slot-1 410, is moved from the shelf system 120, via a robotic transport system, such as transporter 140 of FIG. 1, in a position ready to transfer the tape cartridge from slot-1 410 to the tape drive 130 (shown by the arrow in FIG. 4B).

In step 510, the cartridge from slot-1 410 is inserted in the tape drive 130, thus forming a storage cooperating relationship whereby the tape drive 130 can perform reading and writing operations to and from the tape cartridge 410. As shown in FIG. 4B, the cartridge from slot-1 410 is loaded in the tape drive 130. Following step 510, the first magazine 402 can be returned to the shelf system 120. Notably, the first magazine 402 is shown in a position that facilitated transferring the cartridge from slot-1 410 to the tape drive 130, such as via a picker device 142, prior to returning the first magazine 402 to the shelf system 120.

In step 512, the host 102 transmits data to the library 100 to store on the cartridge from slot-1 410 via the tape drive 130 and/or reads data from the cartridge from slot-1 410.

In step 514, following the storage operations, the host 102 instructs the library 100 to unmount the tape cartridge from the tape drive 130 and return the tape cartridge to slot-1 410. The library 100 buffers the request in storage, which can be a storage device associated with the library 100, and responds to the host 102 that the instruction has been carried out, even though, in actuality, the instruction has not been carried out. An unmount includes the tape cartridge being ejected from the tape drive 130 and moved from the tape drive 130, via the transporter 140 to another location, such as a slot, another tape drive, or other storage facility.

In step 516, the host 102 sends an instruction to the library 100 to mount tape cartridge from address slot-14 420 to the tape drive 130.

In step 518, the second magazine 404, that contains the tape cartridge corresponding to slot-14 420, is moved from the shelf system 120, in a position ready to transfer the tape cartridge from slot-14 420 to the tape drive 130.

In step 520, the cartridge from slot-1 410 is unloaded from the tape drive 130 and moved to the spare slot 422. The library 100, remaps the spare slot 422 to having an address corresponding to slot-1 410. Hence, the cartridge from slot-1 410 is remapped (internal to the library 100) to the second magazine 404. The first magazine 402 possesses the newly created spare slot 409 where the former slot-1 410 was previously mapped. In these embodiments, the newly created spare slot 409 is not necessarily seen by the host 102. Creating the new spare slot 409 is not constrained in the order of events presented in the current example. For example, the new spare slot 409 could be created while or immediately after loading the cartridge from slot-1 410 in step 510.

In an optional embodiment, a host 102 can issue an unmount instruction to the library 100 for the tape cartridge from slot-1 410 to be inserted into a different slot that the host 102 sees as empty, whereby the library 100 can correspond that it complied with the instruction but rather, in actuality, the tape cartridge from slot-1 410 can be inserted in any open or spare slot and remapped as the different slot accordingly. For example, assume the host 102 sees slot-3 as empty; the host 102 can instruct the tape cartridge from slot-1 410 to be disposed in slot-3. The library can fully comply with the unmount instruction, or dispose the tape cartridge from slot-1 410 in the spare slot 422 and remap as slot-3. Optionally, the tape cartridge from slot-1 410 can be disposed in any empty slot and remapped as slot-3, for example.

In step 522, the cartridge from slot-14 420 is inserted in the tape drive 130, thus forming a storage cooperating relationship between the tape drive 130 and the tape cartridge 420. As shown in FIG. 4C, the cartridge from slot-14 420 is loaded in the tape drive 130 and the second magazine 404 is returned to the shelf system 120. Notably, the second magazine 404 is shown in a position that facilitated transferring the cartridge from slot-14 420 to the tape drive 130.

In step 524, the host 102 transmits data to the library 100 to store on the cartridge from slot-14 420 via the tape drive 130 and/or reads data from the cartridge from slot-14 420.

In step 526, following the storage operations, the host 102 instructs the library 100 to unmount the tape cartridge from the tape drive 130 and return the tape cartridge to slot-14 420. The library 100 can buffer the request in storage and responds to the host 102 that the instruction has been carried out, even though, in actuality, the instruction has not been carried out.

In step 528, the host 102 sends an instruction to the library 100 to mount tape cartridge from address slot-22 430 to the tape drive 130.

In step 530, the third magazine 406, that contains the tape cartridge corresponding to slot-22 430, is moved from the shelf system 120, in a position ready to transfer the tape cartridge from slot-22 430 to the tape drive 130.

In step 532, the cartridge from slot-14 420 is unloaded from the tape drive 130 and moved to the spare slot 424. The library 100, remaps the spare slot 424 to having an address corresponding to slot-14 420. Hence, the cartridge from slot-14 420 is remapped to the third magazine 406. The second magazine 404 possesses the newly created spare slot 411 where the former slot-14 420 was previously mapped. The newly created spare slot 411 is not seen by the host 102. Creating the new spare slot 411 is not constrained in the order of events presented in the current example.

In step 534, the cartridge from slot-22 430 is inserted in the tape drive 130, thus forming a storage cooperating relationship between the tape drive 130 and the tape cartridge 430. As shown in FIG. 4D, the cartridge from slot-22 430 is loaded in the tape drive 130. Notably, the third magazine 406 is shown in a position that facilitated transferring the cartridge from slot-22 430 to the tape drive 130.

In step 536, the host 102 transmits data to the library 100 to store on the cartridge from slot-22 430 via the tape drive 130 and/or reads data from the cartridge from slot-22 430.

In step 538, following the storage operations, the host 102 instructs the library 100 to unload the tape cartridge from the tape drive 130 and return the tape cartridge to slot-22 430. The library 100 buffers the request in storage and responds to the host 102 that the instruction has been carried out, even though, in actuality, the instruction has not been carried out.

In step 540, the host 102 sends an instruction to the library 100 to mount tape cartridge from address slot-3 412 to the tape drive 130.

In step 542, the first magazine 402, that contains the tape cartridge corresponding to slot-3 412, is moved from the shelf system 120, in a position ready to transfer the tape cartridge from slot-3 412 to the tape drive 130.

In step 544, the cartridge from slot-22 430 is unloaded from the tape drive 130 and moved to the spare slot 409. The library 100, remaps the spare slot 409 to having an address corresponding to slot-22 430. Hence, the cartridge from slot-22 430 is remapped to the first magazine 402. The third magazine 406 possesses the newly created spare slot 413 where the former slot-22 430 was previously mapped. The newly created spare slot 413 is not seen by the host 102. Creating the new spare slot 413 is not constrained in the order of events presented in the current example.

In step 546, the cartridge from slot-3 412 is inserted in the tape drive 130, thus forming a storage cooperating relationship between the tape drive 130 and the tape cartridge 412. As shown in FIG. 4E, the cartridge from slot-3 412 is loaded in the tape drive 130.

Figure 6A:
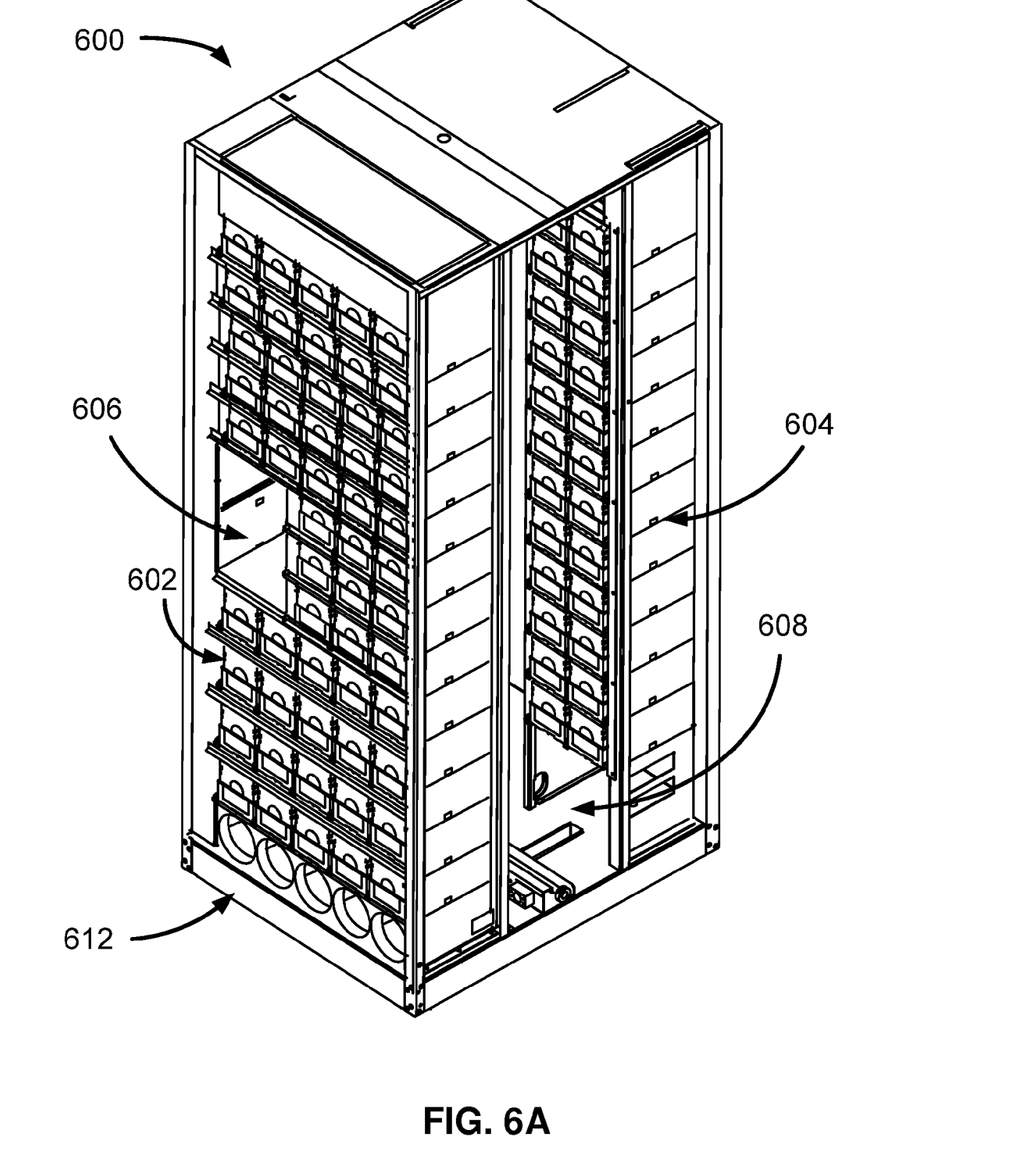
FIGS. 6A and 6B are illustrations of a Spectra Logic T-950e wherein embodiments of the present invention can be commercially practiced.
Figure 6B:
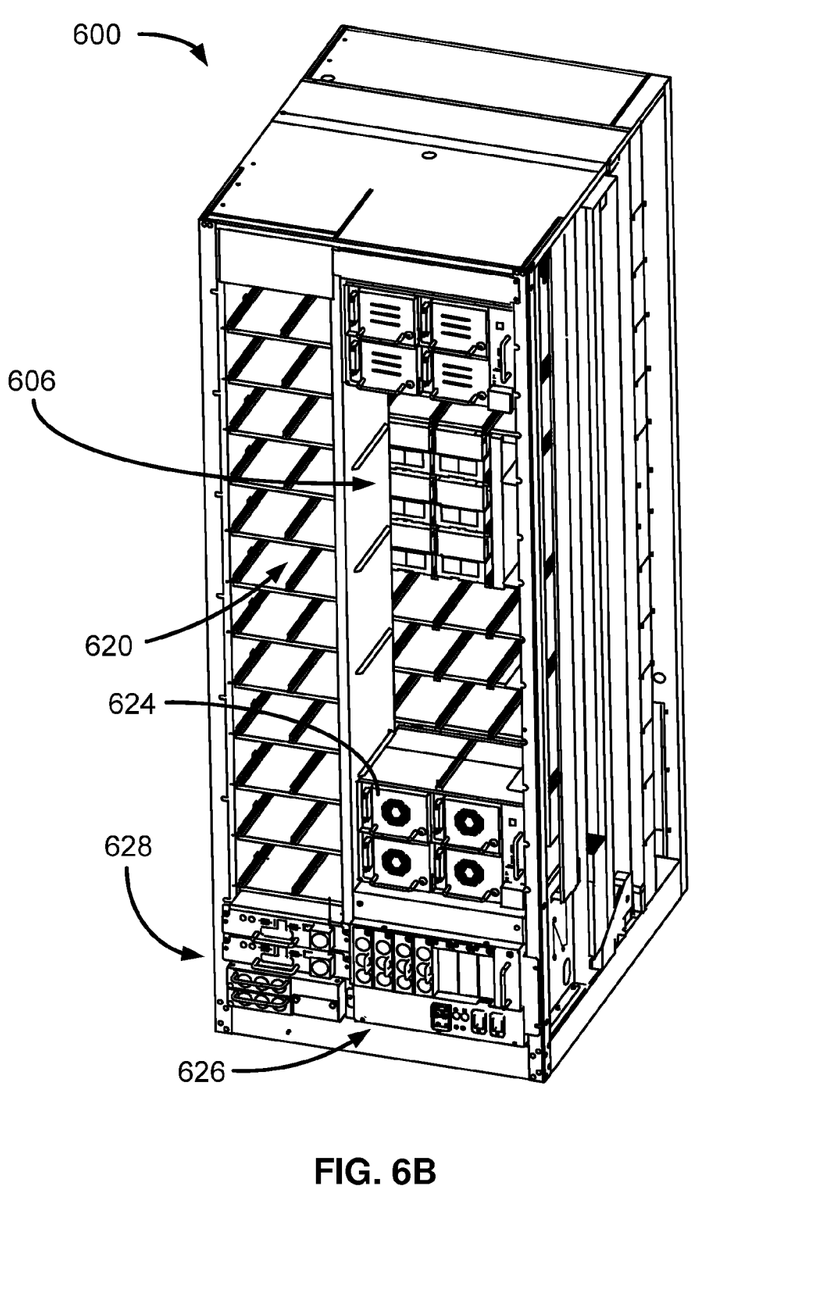

Embodiments of the present invention can be commercially practiced in conjunction with, but not limited to, a T-950 series data storage library 600 produced by Spectra Logic Corporation of Boulder, Colo., as shown in FIGS. 6A and 6B. The T-950 series library 600 is capable of comprising both disc drive magazines and tape cartridges. FIG. 6A shows a front view of the library 600 populated with tape cartridges which are disposed in tape cartridge magazines 602. In one embodiment, the T-950 library 600 comprises a shelf system 604 that is adapted to support the tape cartridge magazines 602 thereby archiving the magazines 602 in the library 600. The T-950 library 600 further comprises a user definable space 606 capable of comprising additional shelf space 604 for storage elements 602 and/or space dedicated for drives, such as an LTO-3 tape drive(s), which form a connection link with the library 600. Functionally interposed between the user definable space 606 and the shelf system 604 is a magazine transport space 608. The magazine transport space 608 is adapted to provide adequate space for a magazine 602 to be moved via a magazine transport device (not shown) from a position in the shelf system 604, for example, to a position ready to transfer a tape cartridge to a drive, such as an LTO-3 tape drive. A picker device (not shown) is integrated with the transport device, whereby the picker device is adapted to that grasp tape cartridges from a magazine 602 and insert the tape cartridge into a drive or move a cartridge from a drive to a magazine 602 and disposes the cartridge in a slot in the magazine 602. Magazines 602 can be transferred into and out from the T-950 library 600 via an entry/exit port 610. Transferring magazines 604 in an out of the T-950 library 600 can be accomplished by an operator, for example. The T-950 library 600 comprises a means for cooling as shown by the fans 612 located at the base of the library 600. The T-950 library 600 further comprises a Graphical User Interface, GUI, which is implemented with a touch screen 614.

With reference to FIG. 6B, shown therein is the T-950 library 600 without an enclosure, rotated 180° relative to FIG. 6A exposing the user definable space 606. The user definable space 606 shows a column of additional shelves 620 for archiving magazines 602 or a block of four LTO-3 tape drives 624, and additional vacant user definable space 606. The T-950 library 600 also comprises a Library Control Module, LCM, 626, the Spectra Logic's FQIP 626, and a power supply 628 capable of converting AC current to DC current for consumption by the library 600.

The T-950 library 600 is capable of bridging communication between at least two different communications protocols on either side of the FQIP 626. The FQIP 626 functions as a combination bridge controller device enabling communication between the T-950 library 600 and a client, or host, in a fibre channel protocol, for example, and communication from the FQIP 626 to a drive 624 via the Computer Area Network (CAN) in a SCSI channel protocol. Furthermore, the FQIP 626 is adapted to direct data for storage on a specific drive possessing a storage element address, SN and WWN. Directing data traffic via the FQIP is provides an adequate environment for mapping host target addresses, such as slots, transporters, and drives for example. The T-950 library 600 is capable of being divided into partitions such that a first client, or host, may be allocated a first partition, or fraction, of the library's 600 storage capacity and resources (for example 60 percent of the storage space within the library 600) and a second client, or host, is allocated the remainder of the library's 600 storage capacity and resources (for example 40 percent of the storage space within the library 600) in a second partition. It should be recognized that the number of partitions can exceed two. One embodiment of the present invention contemplates spare slots as independent of a particular partition.

The T-950 library 600 can map the inventory of slot addresses corresponding to the tape cartridges disposed in the slots in the magazines 602 via middleware/firmware executed on the library's Central Processing Unit (CPU). The middleware/firmware includes software applications that maintain a database of slot address translations (in memory), which is portrayed to a host, or Independent Software Vendor (ISV). Hence, an ISV only sees slot addresses that the library 600 reveals to the ISV. The ISV does not typically see magazines, only the logical slot addresses corresponding to the tape cartridges disposed therein. As slot addresses are shifted from one magazine to the next (as discussed in the method of FIG. 5), the middleware maintains "pointers" to the location of the slot addresses at any given time from a magazine pool (or group of magazines). Therefore, should an ISV instruct the library 600 to load a tape cartridge from a particular slot, such as slot-22, for example, to a target drive, for example, the database of slot address translations locates the appropriate magazine that contains the tape cartridge from slot-22 and proceeds to move the magazine into position and load the tape cartridge in the target drive. If the tape cartridge from slot-22 is disposed in a spare slot in a different magazine, then the middleware operating on the library's CPU will update the database of slot address translation and provide a new pointer to slot-22 in the new magazine.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, tape bar-code addresses or other tape cartridge related address can be used instead of slot addresses, for example, while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 100, communication can be received directly by a drive, such as the first drive 130, via the interface device 152, for example, without departing from the scope and spirit of the present invention. Further, for purposes of illustration, a first and second tape drive and first and second tape cartridges are used herein to simplify the description for a plurality of tape drives and tape cartridges. Finally, although the preferred embodiments described herein are directed to tape cartridge systems, such as the tape cartridges and tape storage systems, such as a tape library and tape drives, and related technology, it will be appreciated by those skilled in the art that the teachings of the present invention can be applied to other systems, such as optical disks (i.e., CDs and DVDs), without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage library comprising:
   a magazine possessing a plurality of slots wherein each slot is adapted to hold a tape cartridge, said slots are mapped to a client, including a first slot mapped via a first slot address, said data storage library adapted to form a link with said client,
   a spare slot in said magazine devoid of being mapped to said client, and
   a first mobile storage cartridge disposed in said first slot wherein prior to being mapped as said first slot, said first slot was formerly another spare slot.

2. The magazine of claim 1 wherein said first slot address was associated with a different magazine when said first mobile storage cartridge was disposed in said different magazine prior to said first mobile storage cartridge being disposed in said magazine.

3. The magazine of claim 1 further comprising a second slot that is mapped to said client via a second slot address, said second slot address is associated with a second mobile storage cartridge wherein said second mobile storage cartridge is loaded in a drive that is capable of storing data to said second mobile storage cartridge.

4. The magazine of claim 3 wherein said spare slot in said magazine was mapped as said first slot after a first request to unmount said first mobile storage cartridge from said cartridge drive was received by said data storage library from said client.

5. The magazine of claim 4 wherein said first request is retained in memory associated with said library, said second request is provoked by informing said client that said first request is completed prior to actually completing said first request.

6. The magazine of claim 3 wherein said first mobile storage cartridge is a tape cartridge and said cartridge drive is a tape drive.

7. The magazine of claim 3 wherein said client issues an unmount instruction of said second mobile storage cartridge to be disposed in a third slot wherein said spare slot or said second slot is remapped as said third slot.

8. The magazine of claim 1 wherein there are at least two spare slots in said magazine.

9. A method used in a data storage library, the method comprising:
   providing a first magazine and a second magazine,
      wherein said first magazine possesses a first slot that corresponds by identity to a first tape cartridge,
      wherein said second magazine possesses a second slot that corresponds by identity to a second tape cartridge,
      said second magazine possessing a second spare slot wherein said second spare slot is devoid of being identified by said client;
   receiving an unmount instruction from a client to dispose said first tape cartridge from a tape drive to said first slot;
   responding to said client that said unmount instruction is accomplished before actually carrying out said unmount instruction;
   receiving a load instruction from said client to load said second tape cartridge in said tape drive;
   in response to said load instruction, moving said second magazine in a position ready to transfer said second tape cartridge from said second magazine to said tape drive;
   unloading said first tape cartridge from said tape drive and disposing said first tape cartridge in said second spare slot;
   remapping said second spare slot to be identified as said first slot; and
   loading said second tape cartridge in said tape drive to form a cooperating read and write relationship.

10. The method of claim 9 further comprising retaining said first instruction in memory associated with said library.

11. The method of claim 9 moving said first magazine to a shelf system associated with said data storage library before receiving said unload instruction.

12. The method of claim 9 wherein said first magazine and said second magazine are moved by a robotic transport system associated with said data storage library and said first and said second tape cartridges are loaded and unloaded from said tape drive via a picker device.

13. A method comprising:
   providing a first mobile storage cartridge that assumes a first identity associated with a first slot address, and a second mobile storage cartridge that assumes a second identity associated with a second slot address, said first and second identities known to a client;

providing a magazine comprising a plurality of slots wherein each slot is adapted to hold a mobile storage cartridge, said magazine further possessing a spare slot that is devoid of a mobile storage cartridge, said spare slot not identified by said client, said magazine possessing said second mobile storage cartridge disposed in a second slot in said magazine, said second slot corresponding to said second slot address;

moving said first mobile storage cartridge from a cartridge drive to said spare slot;

mapping said spare slot to assume said first identity of said first slot address; and moving said second mobile storage cartridge from said second slot to said cartridge drive.

14. The method of claim 13 further comprising receiving an unmount instruction from said client to dispose said first mobile storage cartridge from said cartridge drive to a first slot associated with said first slot address; responding to said client that said unmount instruction is accomplished before actually carrying out said unmount instruction; receiving a load instruction from said client to load said second mobile storage cartridge in said cartridge drive.

15. The method of claim 13 further comprising mounting said second mobile storage cartridge at said cartridge drive; receiving an unmount instruction from said client to dispose said second mobile storage cartridge from said cartridge drive to a fifth slot associated with a fifth slot address; disposing said second mobile storage cartridge in said second spare slot, or any empty slot in any of said magazines; and remapping said second spare slot, or said any empty slot in any of said magazines to said fifth slot address.

16. The method of claim 13 wherein said first mobile storage cartridge and said second mobile storage cartridge are tape cartridges and said cartridge drive is a tape drive.

17. The method of claim 14 further comprising moving said second magazine in a position ready to transfer said second mobile storage cartridge from said second magazine to said cartridge drive; unmounting said first mobile storage cartridge from said cartridge drive and disposing said first mobile storage cartridge in said second spare slot.

18. The method of claim 14 further comprising retaining said load and said unmount instructions in a cache memory device associated with a data storage system that substantially houses said cartridge drive and said magazine.

19. The method of claim 14 further comprising:

providing a third mobile storage cartridge that assumes a third identity associated with a third slot address, said third identity known to said client;

providing a second magazine possessing a second spare slot that is devoid of a mobile storage cartridge, said second spare slot not identified by said client, said second magazine possessing said third mobile storage cartridge disposed in said third slot corresponding to said third slot address;

receiving an unmount instruction from said client to dispose said second mobile storage cartridge from said cartridge drive to said second slot;

responding to said client that said second unmount instruction is accomplished before actually carrying out said second unmount instruction;

receiving a second load instruction from said client to load said third mobile storage cartridge in said cartridge drive;

moving said second magazine in a position ready to transfer said third mobile storage cartridge from said second magazine to said cartridge drive;

unmounting said second mobile storage cartridge from said cartridge drive and disposing said second mobile storage cartridge in said second spare slot;

remapping said second slot identity from said magazine to said second spare slot in said second magazine; and loading said third mobile storage cartridge in said cartridge drive to form a cooperating read and write relationship.

20. The method of claim 19 further comprising moving said magazine to a shelf system and wherein said second magazine is supported by said shelf system prior to moving said second magazine in said position.

21. The method of claim 19 further comprising converting said second slot in said magazine to a spare slot.

22. The method of claim 14 further comprising a means for retaining said load and said unmount instructions associated with a data storage system that substantially houses said cartridge drive and said magazine and a means for remapping said second slot identity.

23. The method of claim 14 wherein said magazine and said cartridge drive are comprised in a magazine storage library.

24. A data storage library that transfers data between a client and a data storage device in response to access commands from the client, the data storage library comprising:

a magazine defining a plurality of slots that are individually addressable;

a transporter that selectively moves the magazine to a remove/insert position;

a plurality of data storage devices, each removably insertable by the transporter into a respective one of the plurality of slots; and mapping logic executing computer instructions stored in memory that are responsive to one of the access commands to identify an available slot in the magazine for a previously removed data storage device, the available slot being different than another slot from which the previously removed data storage device was previously removed.

25. The data storage library of claim 24 wherein the transporter is responsive to the mapping logic to insert the previously removed data storage device into the available slot.

26. The data storage library of claim 25 wherein the mapping logic furthermore maps a logical address associated with the previously removed data storage device to the available slot in which it resides.

27. The data storage library of claim 26 wherein the mapping logic furthermore communicates the mapped relationship to the client.

* * * * *